(12) United States Patent
Coyne et al.

(10) Patent No.: US 7,438,862 B2
(45) Date of Patent: Oct. 21, 2008

(54) APPARATUS FOR SIMULTANEOUS PROCESSING OF MULTIPLE SAMPLES

(75) Inventors: Ann N. Coyne, Voorhees, NJ (US); Michael J. Telepchak, Yardley, PA (US); Philip Spraker, Max Meadows, VA (US); Jay Hardee, Conyers, GA (US); John A. D'Asaro, Bensalem, PA (US)

(73) Assignee: United Chemical Technologies, Inc., Bristol, PA (US)

( * ) Notice: Subject to any disclaimer, the term of this patent is extended or adjusted under 35 U.S.C. 154(b) by 1239 days.

(21) Appl. No.: 10/222,192

(22) Filed: Aug. 16, 2002

(65) Prior Publication Data

US 2003/0035759 A1 Feb. 20, 2003

Related U.S. Application Data

(60) Provisional application No. 60/313,210, filed on Aug. 17, 2001.

(51) Int. Cl.
*B01L 3/00* (2006.01)

(52) U.S. Cl. .................................. 422/102; 422/104

(58) Field of Classification Search .............. 422/102, 422/104
See application file for complete search history.

(56) References Cited

U.S. PATENT DOCUMENTS

| | | | |
|---|---|---|---|
| 3,730,352 A | 5/1973 | Cohen et al. | |
| 5,223,133 A | 6/1993 | Clark et al. | |
| 5,565,173 A | 10/1996 | DeWitt et al. | |
| 5,609,826 A | 3/1997 | Cargill et al. | |
| 5,650,323 A * | 7/1997 | Root | 435/284.1 |
| 5,888,830 A * | 3/1999 | Mohan et al. | 436/174 |
| 5,961,925 A | 10/1999 | Ruediger et al. | |
| 6,054,100 A | 4/2000 | Stanchfield et al. | |
| 6,267,930 B1 | 7/2001 | Ruediger et al. | |
| 6,419,827 B1 | 7/2002 | Sandell et al. | |
| 6,425,296 B1 | 7/2002 | Brust et al. | |

\* cited by examiner

*Primary Examiner*—Jill Warden
*Assistant Examiner*—Natalia Levkovich
(74) *Attorney, Agent, or Firm*—Drinker Biddle & Reath LLP

(57) ABSTRACT

An apparatus is provided for simultaneous processing of multiple fluid samples. The apparatus comprises a multiple well plate for holding a plurality of sample reservoirs for simultaneous processing of multiple samples. The wells are configured in the plate in staggered rows. The well plate is dimensioned to be compatible with a vacuum manifold or positive pressure system either as a stand-alone unit or in conjunction with a separate fluid handling system. The apparatus may further comprise a sample collection plate having the same number of wells as the multiple well plate. The wells in the samples collection plate are arranged in the same staggered configuration as the wells in the well plate and are sized for holding sample collection vials. When the well plate and sample collection plate are assembled in a manifold, the vials in the sample collection plated are aligned directly beneath the sample exits of corresponding sample reservoirs in the well plate.

19 Claims, 6 Drawing Sheets

APPARATUS FOR SIMULTANEOUS PROCESSING OF MULTIPLE SAMPLES

This application claims priority to provisional application 60/313,210, filed Aug. 17, 2001, the contents of which are hereby incorporated by reference in its entirety.

FIELD OF THE INVENTION

The present invention relates to instruments for the automated handling of multiple samples. Specifically, the present invention relates to an apparatus for the simultaneous processing and filtration of a plurality of samples.

BACKGROUND OF THE INVENTION

A number of laboratory settings require the accurate handling of large volumes of samples. In industries such as forensics, clinical monitoring, toxicology, pharmaceutical high throughput screening, environmental toxicology, agricultural pesticide residue analysis, and synthesis and purification during combinatorial chemistry, large numbers of similar samples are processed using an array of methodologies including Solid Phase Extraction (SPE), filtration and derivitization. The large number of samples involved and the perishable nature of some of them makes speed in analysis of the utmost importance. Balanced against this need for speed is the need for accuracy. In some cases tight government regulation of these industries requires that strict standards for accuracy and reproducibility of assays be met.

In answer to these requirements, devices have been developed that allow for the simultaneous processing of multiple samples in automated systems. In standard devices of this type, a well block is provided having either 48 or 96 wells in ordered rows. These wells accommodate a similar number of sample reservoirs for processing and filtration of the samples to be analyzed. The sample reservoirs may take the form of a modified tube with a luer tip. The sample reservoirs may be packed with a resin or filtration media. When assembled in the well block, the reservoirs are typically connected or touching. These devices are used as stand-alone systems or in conjunction with automated robotic fluid handling systems.

The blocks are sized and dimensioned to fit vacuum manifolds necessary for applying vacuum to the luer tips to effect filtration of the processed samples and to be compatible with the automated equipment. The size of the well block is therefore limited by the dimensions of the vacuum manifold and the requirements of the associated equipment. The size of the well block and the ordered arrangement of the wells necessarily places limits on the size of the sample reservoirs that can be used with the well block. Typically, samples reservoirs used with current well blocks have a nominal capacity of 2 mL or less, depending on the filtration media or packing used. Additionally, when installed in the well block, most current sample reservoirs are in physical contact with one another.

The design of the well blocks currently in use presents several problems. Very often in the applications where these devices are used, the samples tested are very dilute or require a large amount of analyte. For this reason, it is very often necessary to fill the small sample reservoirs to near capacity to obtain a sample with sufficient analyte. This combined with the contiguous arrangement of the sample reservoirs often leads to cross-contamination of the samples. Additionally, it is sometimes not possible to introduce enough sample to the sample reservoir to obtain the accuracy or reproducibility required for some assays.

It would be desirable to provide a well block for use with a standard vacuum manifold that overcomes the limitations of the current designs by allowing the use of larger sample reservoirs. It would further be desirable to provide a well block in which the sample reservoirs are not in physical contact when assembled in the well block. It would further be desirable to provide such a well block that is compatible with the instruments and assays currently in use in all laboratory environments. It would still further be desirable to provide such a well block that can be either re-usable or disposable after use.

SUMMARY OF THE INVENTION

The current invention provides an apparatus for simultaneous processing, extraction and/or filtration of multiple samples, that is compatible with standard vacuum manifolds in use with liquid handling systems. The apparatus comprises a multiple well plate for holding a plurality of sample reservoirs for simultaneous processing of multiple samples. The wells are configured in the plate in staggered rows. Preferably, the well plate contains 48 wells arranged in symmetrical staggered rows of 4×12. The well plate can be made of a number of materials of construction, but is preferably constructed of polypropylene, nylon or polyethylene, or advanced engineered plastics such as CORIAN® or TEFLON®. The well plate is dimensioned to be compatible with a vacuum manifold or positive pressure system either as a stand-alone unit or in conjunction with a separate fluid handling system. In a preferred embodiment, the apparatus further comprises a sample collection plate having the same number of wells as the multiple well plate. The wells in the samples collection plate are arranged in the same staggered configuration as the wells in the well plate and are sized for holding sample collection vials. In this preferred embodiment, when the well plate and sample collection plate are assembled in a manifold, the vials in the sample collection plate are aligned directly beneath the sample exits of corresponding sample reservoirs in the well plate. Both the well plate and the sample collection plate are dimensioned to be compatible with a vacuum manifold or positive pressure system either as a stand-alone unit or in conjunction with a separate fluid handling system. Alternatively, the apparatus may utilize simple gravity filtration.

DETAILED DESCRIPTION OF THE INVENTION

The apparatus according to the current invention provides a multiple well plate for simultaneous processing, extraction and/or filtration of multiple samples. The wells in the well plate arranged in staggered rows. This staggered arrangement of the wells in the well plate allows larger sample reservoirs to be used while maintaining a compact size for the well plate itself. Further, in the staggered arrangement the sample reservoirs are not in physical contact when they are installed in the well plate.

Figure 1B:
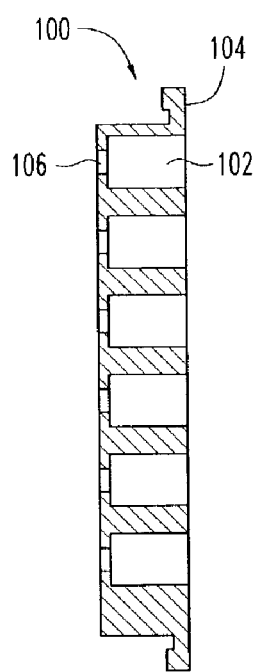
FIG. 1B illustrates a cross section view of a well plate according to the current invention.
Figure 1A:
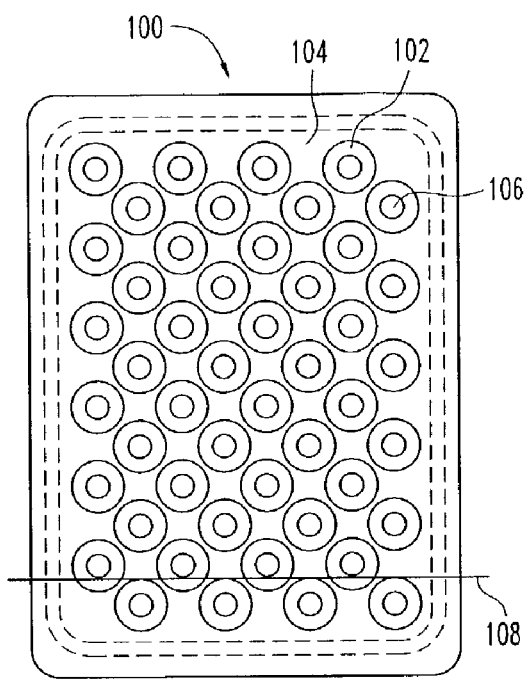
FIG. 1A illustrates a perspective view of the top of a well plate according to the current invention.

Referring to FIG. 1A, a perspective view of the top of a preferred embodiment of a well plate 100 according to the current invention is shown. A plurality of wells 102 are bored into the top surface 104 of the well plate 100. The wells are bored only partially through the well plate 100. Preferably, the number of wells 102 in the well plate 100 is some multiple of 4. More preferably, the number of wells is 48 or 96. Most preferably, the number of wells is 48. The wells 102 are sized for receiving a sample reservoir. Preferably, the wells are sized to receive sample reservoirs having a nominal volume of 4.5 mL. Each of the wells 102, has a concentric aperture 106 punched completely through the well plate 100. The well plate can be made of a number of materials of construction, but is preferably constructed of polypropylene, nylon or polyethylene, or advanced engineered plastics such as CORIAN® or TEFLON®.

Referring to FIG. 1B, a cross section of a well plate 100 according to the current invention is shown. The apertures 106 in the wells 102 are preferably sized to closely engage the tip of a sample reservoir.

Figure 2:
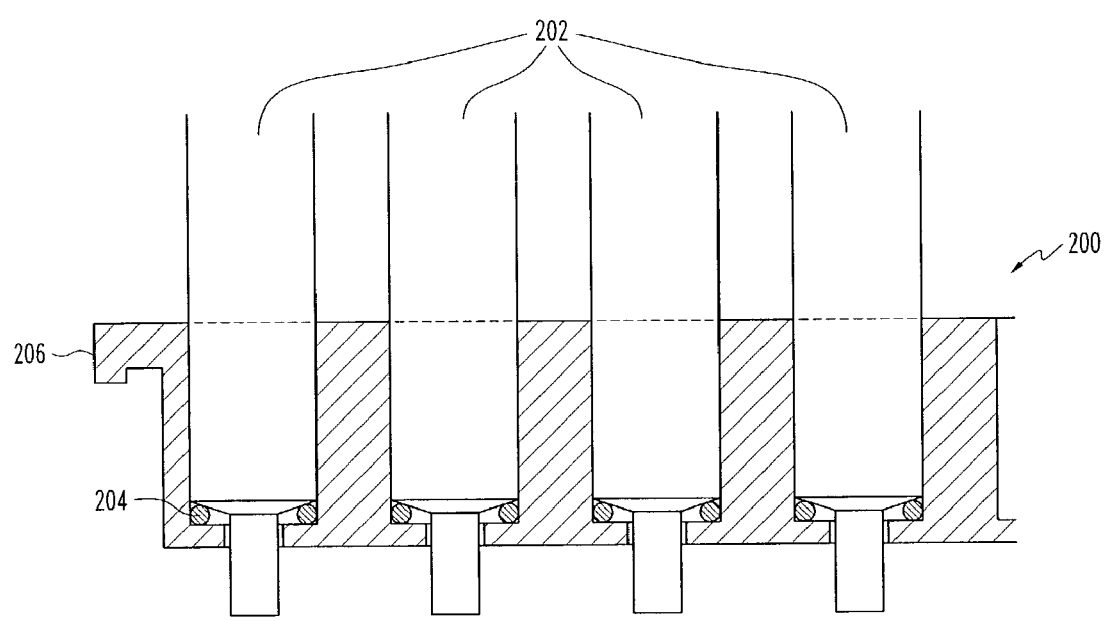
FIG. 2 illustrates a cross section view of preferred embodiment of a well plate according to the current invention.

Referring to FIG. 2, a cross section of a well plate 200 is shown with sample reservoirs 202 installed. In one embodiment, an O-ring 204 is provided in each well of the well plate. The O-ring 204 seats against the sample reservoir 202 to provide a vacuum tight seal during vacuum filtration.

As used herein, the term "sample reservoir" refers to any type of column, cartridge or filter that is normally used in chemical synthesis, chemical analysis, forensics, medicinal chemistry, medical analysis, biochemistry or other process. The reservoirs for use with the manifold are preferably a unique modified syringe type barrel with a luer slip tip. The reservoirs may be constructed of any number of materials, including but not limited to polymer, glass, stainless steel and TEFLON®. Preferably, the sample reservoirs are made of polypropylene and have a nominal volume of 4.5 mL. The sample reservoirs may contain alone or in combination any number of filtration media or packing material. Filtration media and packing material suitable for use with the current invention includes but is not limited to: unbonded or bonded phase silica, FLORISIL®, alumina, polymeric sorbents/ion exchangers, diatomaceous earth, silica impregnated TEFLON® disks, carbon and silanized wool. The sample reservoirs preferably contain a first bottom frit at the luer end and a second top frit to retain the filtration media and/or packing material.

In a preferred embodiment, the sample reservoirs are removable from the well plate. In this embodiment, the plate can be reused multiple times with new sample reservoirs. In an alternative embodiment, the sample reservoirs are fixed in place and the entire assembly is disposable after use.

Referring back to FIG. 1A, the staggered alignment of the wells in the well plate is shown. A line 108, drawn tangent to the wells in a first row intersects an arc in the wells of a neighboring row. This overlapping staggered alignment of the wells allows larger wells, for accommodating larger sample reservoirs than would be possible with and ordered arrangement of wells on a similar sized well plate. Most preferably, the wells 102 are arranged in 12 rows of 4 wells each.

Figure 3B:
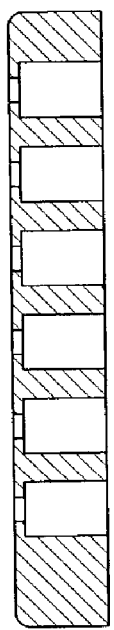
FIG. 3B illustrates a cross section view of a sample collection plate according to the current invention.
Figure 3A:
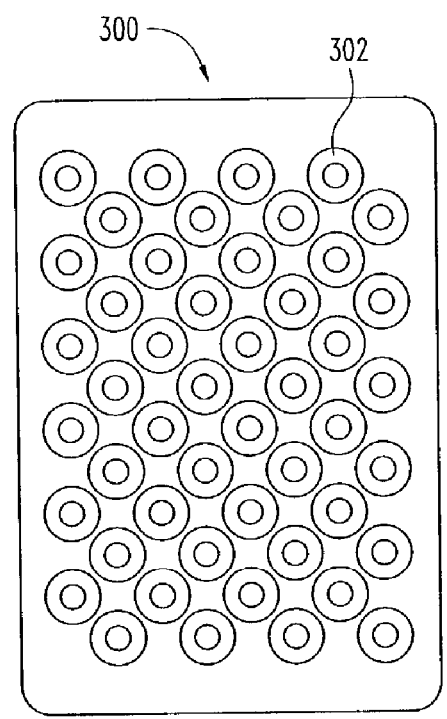
FIG. 3A illustrates a perspective view of the top of a sample collection plate according to the current invention.

In a preferred embodiment, the apparatus further comprises a sample collection plate for use with the well plate. Referring to FIGS. 3A and 3B, a sample collection plate 300 according to the current invention is shown. Preferably the collection plate is sized and dimensioned to match the footprint of the well plate. The collection plate contains wells 302 arrayed in the same staggered rows as the wells in the well plate. Preferably, the collection plate contains 48 wells arranged in 4×12 staggered rows. The wells 302 in the collection plate are sized and dimensioned to accommodate collection vials. The collection vials can be either removable from or integral with the collection plate. Preferably, the collection vials are removable from the collection plate. The collection plate can be made of a number of materials of construction, but is preferably fabricated from polypropylene, nylon or polyethylene, or advanced engineered plastics such as CORIAN® or TEFLON®.

Figure 4:
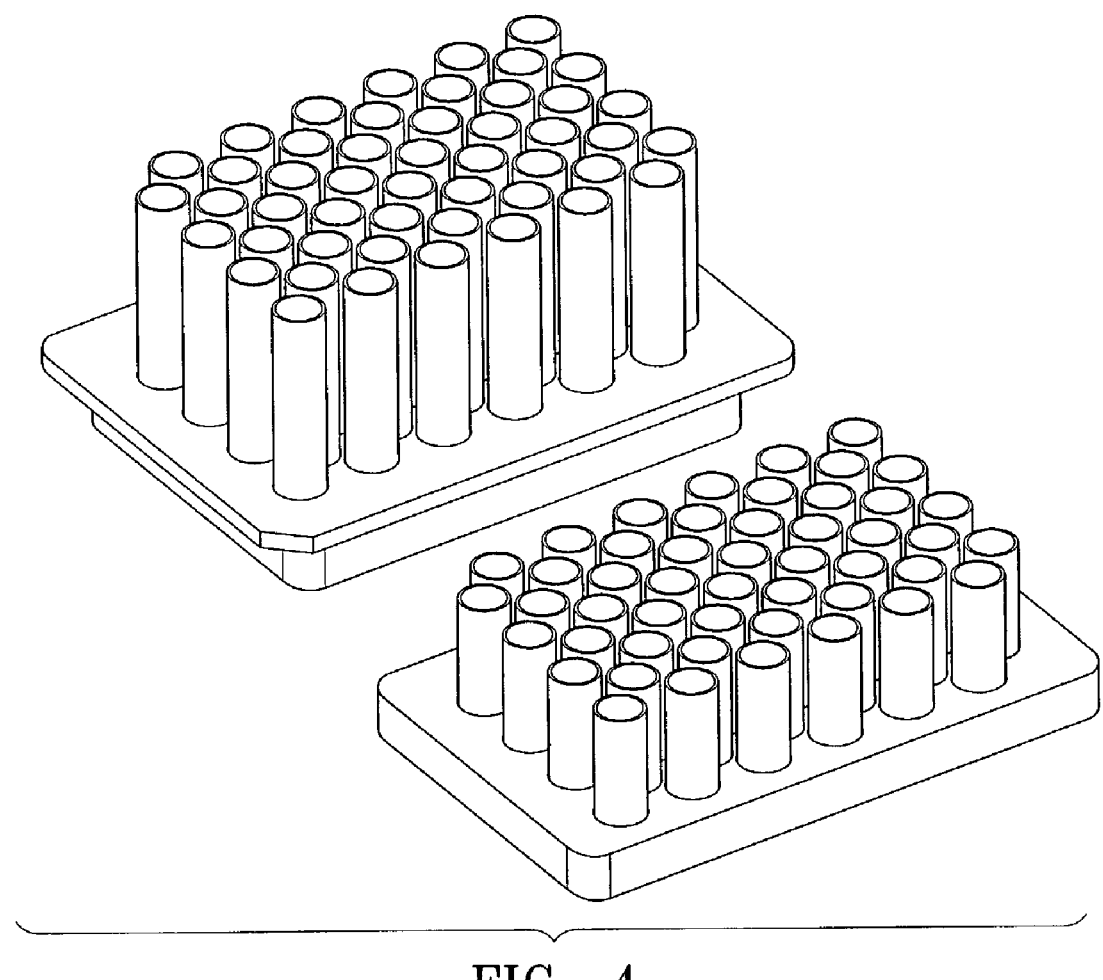
FIG. 4 illustrates a preferred embodiment of the apparatus having matching well plate and sample collection plate.

Referring to FIG. 4, a preferred embodiment of the apparatus having matching well plate 400 and sample collection plate 402 is shown.

Figure 5:
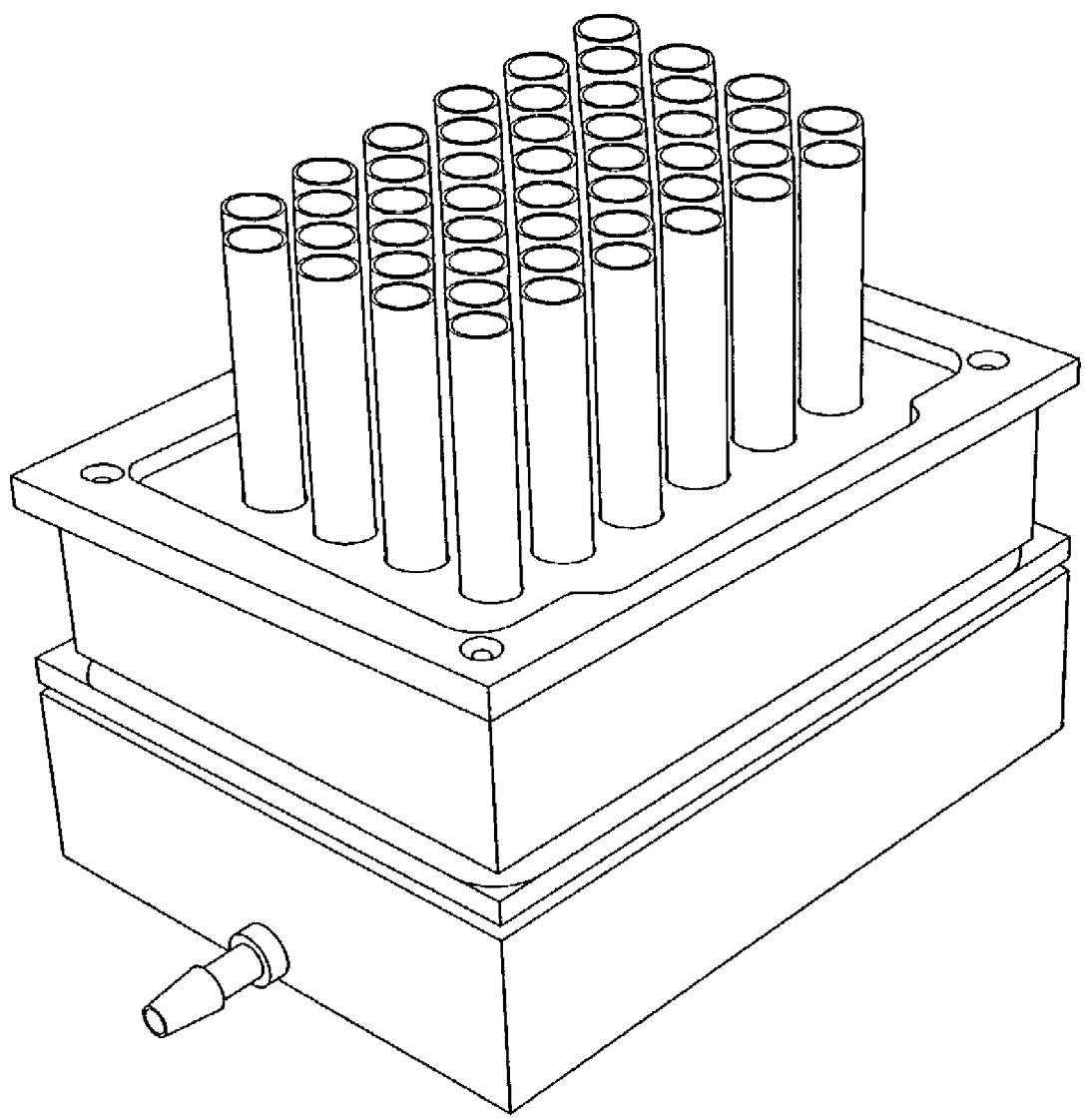
FIG. 5 illustrates the apparatus according to the current invention assembled in a compatible vacuum manifold.

When in use, the apparatus may be assembled in a compatible vacuum manifold in a manner recognized in the art. The vacuum manifold generally comprises a hollow rectangular body with a vacuum valve and an opening in one side for receiving the well plate. Referring back to FIG. 2, in a preferred embodiment, the well plate 200 has a rim 206 disposed about the peripheral edge of the well plate. Preferably, the opening in the manifold is provided with a rim or lip that engages a mating rim on the well plate. Vacuum is applied to the manifold via the vacuum valve in a known manner, causing the liquid samples to be drawn through the luer tips. One or more gaskets may be interposed between the manifold rim and the well plate rim to ensure adequate vacuum. Still referring to FIG. 2, the rim of the well plate may have a groove 208 for receiving a gasket. Referring to FIG. 5, the apparatus according to the current invention is shown assembled in a typical compatible vacuum manifold.

In the embodiment including the collection plate, the apparatus is assembled with the collection plate disposed inside the vacuum manifold such that the well plate is disposed directly over the collection plate with the luer tips of the sample reservoirs aligned over the openings of the collection vials.

Alternatively, the apparatus according to the present invention is also operable with positive pressure systems or by simple gravity filtration.

Figure 6:
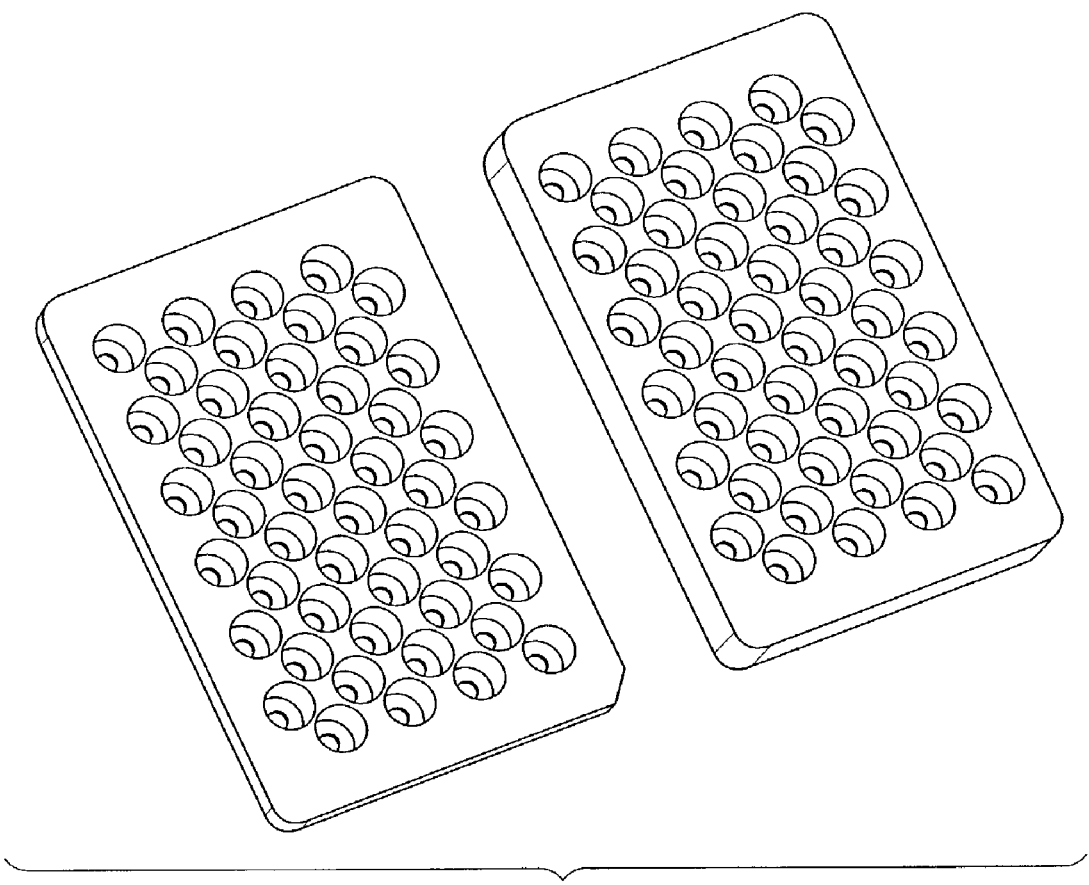
FIG. 6 illustrates a perspective view of a well plate and a sample collection plate according to the current invention.

Both the well plate and collection plate of the apparatus, a perspective view of which are shown in FIG. 6, can be sized, dimensioned or otherwise modified to be compatible with a wide range of vacuum manifolds or positive pressure systems for use as a stand-alone device or in conjunction with a fluid handling system. Referring to FIG. 6, the well plate 600 and sample collection plate 602 may be further modified to make them compatible with robotic arms and grips commonly used in automated sample testing. All of these variations are considered to be within the scope of the current invention.

What is claimed is:

1. An apparatus for simultaneous processing of multiple fluid samples, said apparatus comprising:
    a well plate having a top surface, a bottom surface and a peripheral edge,
    a first plurality of cylindrical wells bored into said top surface and partially through said well plate,
    each of said first plurality of wells having a circumference sized for closely receiving the barrel of a sample reservoir, each of said first plurality of wells further having a concentric aperture punched completely through to said bottom surface of said well plate, said aperture being sized to receive a tip of a sample reservoir, said first plurality of wells being arranged in staggered rows such that a line drawn tangent to the circumferences of a first row of wells will intersect an arc in the circumferences of a neighboring row of wells.

2. The apparatus according to claim 1, further comprising:
a sample collection plate having a top surface, and a peripheral edge,
a second plurality of cylindrical wells bored into said top surface and partially through said sample collection plate,
each of said second plurality of wells being sized for receiving a sample collection vial,
said second plurality of wells being arranged in staggered rows matching said first plurality of wells in said well plate, such that when said sample collection plate is aligned beneath said well plate, a plurality of vials inserted into said second plurality of wells are aligned directly beneath the tips of a plurality of sample reservoirs inserted in said first plurality of wells.

3. The apparatus according to claim 1, wherein said well plate further comprises a rim disposed about said peripheral edge, said rim having a top surface and a bottom surface, said bottom surface of said rim being configured for supporting said well plate in a manifold.

4. The apparatus according to claim 3, wherein said peripheral rim further comprises a groove disposed on said bottom surface of said rim.

5. The apparatus according to claim 1, said well plate further comprising:
an O-ring disposed within each of said first plurality of wells.

6. The apparatus according to claim 1, wherein said well plate and said sample collection plate each have 48 wells arranged in 12 rows of 4 wells each.

7. The apparatus according to claim 1, wherein said plurality of wells in said well plate are sized to receive sample reservoirs having a nominal capacity of 4.5 mL.

8. The apparatus according to claim 1, wherein said sample reservoirs are integral with said well plate.

9. An apparatus for simultaneous processing of multiple fluid samples, said apparatus comprising:
a well plate having a top surface, a bottom surface and a peripheral edge, and
a rim disposed about said peripheral edge, said rim configured for supporting said well plate in a manifold;
said well plate having first 48 cylindrical wells bored into said top surface and partially through said well plate,
each of said first 48 wells in said well plate being sized to receive sample reservoirs having a nominal capacity of 4.5 mL,
each of said first 48 wells further having a concentric aperture punched completely through to said bottom surface of said well plate, said aperture being sized to receive a tip of a sample reservoir,
said 48 wells being arranged in 12 staggered rows of 4 wells each such that a line drawn tangent to the circumferences of a first row of 4 wells will intersect an arc in the circumferences of a neighboring row of 4 wells; and
a sample collection plate having a top surface, and a peripheral edge,
said sample collection plate having second 48 cylindrical wells bored into said top surface and partially through said sample collection plate,
each of said second 48 wells being sized for receiving a sample collection vial,
said second 48 wells being arranged in 12 staggered rows of 4 wells each, matching said first 48 wells in said well plate, such that when said sample collection plate is aligned beneath said well plate, vials inserted into said second 48 wells are aligned directly beneath the tips of sample reservoirs inserted in said first 48 wells.

10. The apparatus according to claim 9, said well plate further comprising:
an O-ring disposed within each of said first plurality of wells.

11. The apparatus according to claim 9, wherein said sample reservoirs are integral with said well plate.

12. The apparatus according to claim 9, wherein said rim has a top surface and a bottom surface, and a groove disposed on said bottom surface of said rim.

13. An apparatus for simultaneous processing of multiple fluid samples, said apparatus comprising:
a well plate having a top surface, a bottom surface and a peripheral edge,
a plurality of sample reservoirs integral with said well plate, each of said sample reservoirs having an aperture therein for communicating a fluid sample through said well plate,
said plurality of sample reservoirs being arranged in staggered rows such that a line drawn tangent to the circumferences of a first row of sample reservoirs will intersect an arc in the circumferences of a neighboring row of sample reservoirs.

14. The apparatus according to claim 13, further comprising:
a sample collection plate having a top surface, and a peripheral edge,
a plurality of cylindrical wells bored into said top surface and partially through said sample collection plate,
each of said second plurality of wells being sized for receiving a sample collection vial,
said plurality of wells being arranged in staggered rows matching said plurality of sample reservoirs in said well plate, such that when said sample collection plate is aligned beneath said well plate, a plurality of vials inserted into said plurality of wells are aligned directly beneath the apertures of said plurality of sample reservoirs in said well plate.

15. The apparatus according to claim 13, wherein said well plate has 48 sample reservoirs arranged in 12 rows of 4 sample reservoirs and said sample collection plate has 48 wells arranged in 12 rows of 4 wells each.

16. The apparatus according to claim 14, wherein said plurality of sample reservoirs in said well plate have a nominal capacity of 4.5 mL.

17. The apparatus according to claim 13, wherein said well plate further comprises a rim disposed about said peripheral edge, said rim having a top surface and a bottom surface, said bottom surface of said rim being configured for supporting said well plate in a manifold.

18. The apparatus according to claim 17, wherein said peripheral rim further comprises a groove disposed on said bottom surface of said rim.

19. The apparatus according to claim 13, wherein said aperture in said sample well comprises a luer tip.

* * * * *